United States Patent [19]

Tirole et al.

[11] 4,392,656
[45] Jul. 12, 1983

[54] AIR-COOLED SEALING RINGS FOR THE WHEELS OF GAS TURBINES

[75] Inventors: Jacques P. H. Tirole, Sevres; Claude M. Mons, Savigny Le Temple; Roland R. Spinat, Bretigny sur Orge, all of France

[73] Assignee: Societe Nationale d'Etude et de Construction de Moteurs d'Aviation, "S.N.E.C.M.A.", Paris, France

[21] Appl. No.: 200,036

[22] Filed: Oct. 23, 1980

[30] Foreign Application Priority Data

Oct. 26, 1979 [FR] France ................................ 79 26666

[51] Int. Cl.³ ........................ F01D 11/08; F02F 11/00
[52] U.S. Cl. ........................................ 277/53; 415/174
[58] Field of Search ............................ 277/16, 53–56; 415/174

[56] References Cited

U.S. PATENT DOCUMENTS

| 3,013,641 | 12/1961 | Compton . | |
|---|---|---|---|
| 3,082,010 | 3/1963 | Morley et al. | 277/16 |
| 3,092,393 | 6/1963 | Morley et al. | 277/16 |
| 3,425,665 | 2/1969 | Lingwood . | |
| 3,603,599 | 9/1971 | Laird . | |
| 3,719,365 | 3/1973 | Emmerson . | |
| 3,825,364 | 7/1974 | Halila . | |
| 3,834,001 | 9/1974 | Caroll . | |
| 3,880,435 | 4/1975 | Thornbald . | |
| 4,135,851 | 1/1979 | Bill . | |

FOREIGN PATENT DOCUMENTS 1547084 10/1968 France .
2407343 5/1979 France .
1308771 3/1973 United Kingdom .

Primary Examiner—Robert I. Smith
Attorney, Agent, or Firm—Bacon & Thomas

[57] ABSTRACT

Sealing ring for the wheel of a gas turbine comprising successively from the periphery toward the axis, an annular support surrounding the wheel, an annular cooling layer attached to the annular support and made of a material permeable by air, and an annular wear layer. The sealing ring further contains a separating layer inserted between the cooling layer and the wear layer.

7 Claims, 4 Drawing Figures

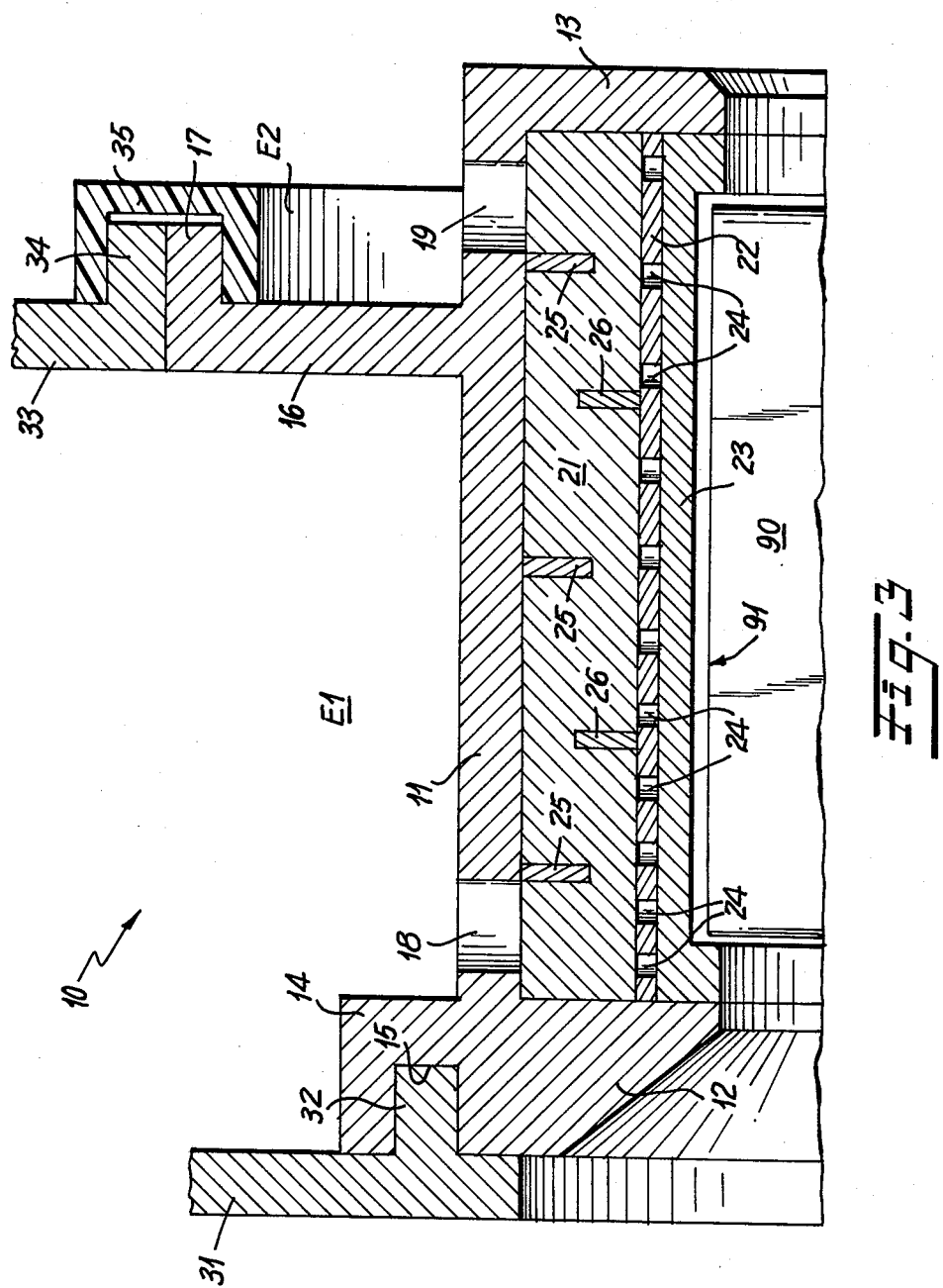

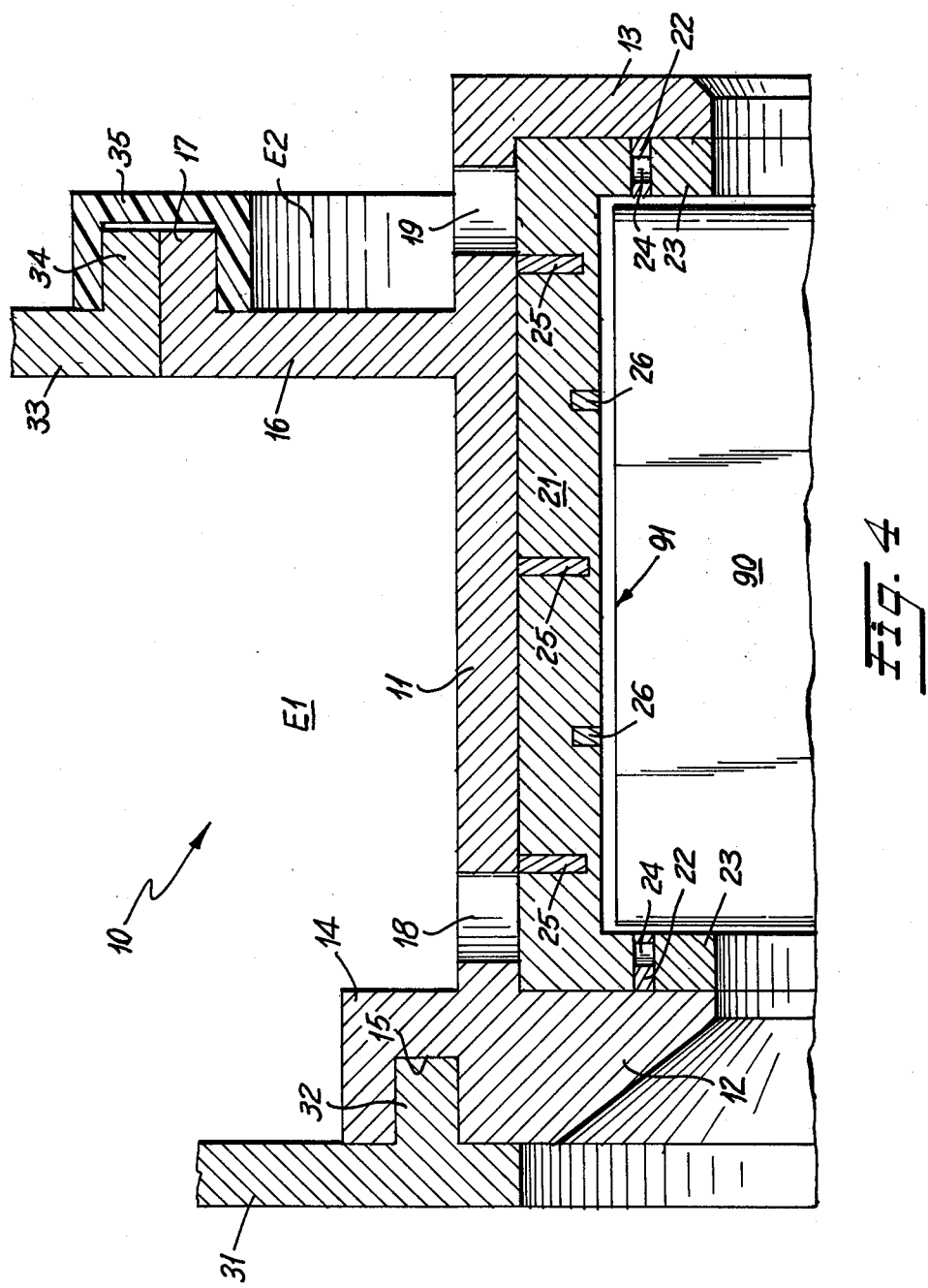

AIR-COOLED SEALING RINGS FOR THE WHEELS OF GAS TURBINES

BACKGROUND OF THE INVENTION

The invention concerns gas turbines and in particular gas turbines of aircraft turbojet engines. It concerns more specifically a sealing ring to be placed around a wheel of a gas turbine to limit gas leaks at the ends of the blades.

In general, the cooling of the turbine elements in contact with the propelling gases permits an increase in the combustion temperature and consequently of the power and yield of the turbojet engine. In regard to the gasket seals made of a material capable of being abraded by the ends of the blades, it has already been proposed to cool them by means of the forced circulation of a fraction of the flow of air delivered by the compressor through the pores or interstices of said material. U.S. Pat. No. 3,825,364 describes, for example, a sealing ring comprising in succesion from the periphery toward the axis:

(a) an annular support placed around the wheel, (b) a first annular layer (to be designated for the moment as the "distributing layer"), attached to said annular support and made of a material permeable to air, (c) a second annular layer (to be designated the "wear layer") secured to the inside of the distributing layer, extending to the immediate vicinity of the blades of the wheel and made of a porous material with open pores, capable of being abraded by ends of the blades and unaffected by the thermal and chemical action of the gases driving the wheel.

The annular support is designed so as to form an annular passage around the distributing layer. Orifices provided in the annular support act to divert a fraction of the compressor air flow toward the annular passage. The air permeability of the wear layer is greater than that of the distributing layer which is supposed to distribute the cooling air homogeneously through the wear layer. The fact that the latter is designed to be more permeable than the distributing layer is intended to maintain the air flow at its initial value even when wear by the ends of the blades leads to a partial obstruction of the superficial pores of the wear layer.

This process of cooling the wear layer by the circulation of air through the layer in actual fact has significant disadvantages whereby the device of the prior art described hereinabove attains its object in part only. In fact, in order for the air to flow at an adequate rate in spite of the pressure prevailing in the jet it is necessary to force it around the distributing layer under a relatively high pressure (for example, of the order of 15 bars); this affects the performance of the turbojet engine;

because of the variation of gas pressure during its passage through the wheel, the distribution of the air flow through the wear layer is not as homogeneous as might be expected; the air moves in the layer not only in the radial direction (i.e., transversely to the layer), but also axially (i.e., parallel to the axis of the wheel) and the axial flow opposes the radial flow;

even though, when the gasket is new, the permeability of the wear layer is greater than that of the distributing layer, the superficial pores or interstices of the wear layer become obstructed more or less in the long run, by pollution and by "coating" and the cooling air flow may decrease dangerously;

the choice of the properties of the two layers are closely related to each other, because the cooling air passes through both, but its flow rate must remain limited by the cooling layer; the selections thus are the result of a compromise;

finally, the gasket is thicker than the gaskets of the prior art, because the thickness of the wear layer is added to that of the distributing layer and must be of a sufficient thickness to be able to play its role as a distributor of air.

SUMMARY OF THE INVENTION

The cooled sealing ring of the present invention comprises, in succession from the periphery toward the axis, in the same manner as in the devices of the prior art cited hereinabove:

an annular support surrounding the wheel, a first annular layer designated "cooling layer" hereinafter, attached to said annular support and made of a material permeable by air;

a wear layer extending to the immediate vicinity of the blades of the wheel and made of a material abradable by the ends of the blades and unaffected by the thermal and chemical action of the gases moving the wheel.

The device further contains means to admit the air circulating in the cooling layer and it is characterized by that it also comprises a third layer called "separating layer" interposed between the two other layers and made of a material having an air permeability such that the radial air flow traversing the layer is appreciably less than the axial flow of air passing through the cooling layer.

In numerous applications, this radial air flow may also be zero, i.e., the separating layer is air tight.

If, in a first approximation, the slight flow of air traversing the separating layer is neglected, it is found that the layer is cooled both by the forced convention of the air circulating in contact with it and by heat conduction toward the cooling layer which is cooled vigorously by forced convection. The wear layer, on the other hand, is cooled primarily by conduction to the separating layer. The choice of material of the cooling layer and the wear layer are not related to each other and these choices may be made so as to provide optimum characteristics for both layers. In particular, the air permeability of the cooling layer may be as high as desirable, without having to consider the permeability of the wear layer. Furthermore, the cooling is not affectd by a partial warpage of the wear layer.

As indicated hereinabove, a separating layer that is completely impermeable to air may be used (for example, by making it out of foil), or it may be provided with a certain degree of permeability (perforated foil). In the case wherein the separating layer is made by means of plasma spraying, once said layer is obtained, the operation is continued with a different nozzle setting, which provides the wearing material with a porosity that is different from that of the separating layer, even though the same material is used. If the wear layer consists of a ceramic material, the separating layer, applied by spraying, constitutes the anchoring layer of the wear material. The cooling action of the air passing through the wear layer thus complements that of the cooling layer and the separating layer may be provided with a permeability that decreases from upstream to downstream so that a homogeneous distribution of the radial flow may be obtained in spite of the variation of the gas pressure during the passage of the wheel.

As the separating layer acts by means of conduction and not by thermal diffusion, it is important to make it as thin as possible, in a measure compatible with manufacturing possibilities and the requirements of mechanical strength. In order to facilitate the cooling of the wear layer, it is equally important to make the latter as thin as possible compatible with the deformation of the rotor due to differential dilation and to the slight unbalances caused by normal operation. Thus, the separating layer is appreciably thinner than the wear layer which itself is appreciably thinner than the cooling layer. Furthermore, however, and always remaining within the scope of the invention, it may be advantageous to make the cooling layer also of a material abradable by the ends of the blades and to make the separating layer of a sheet that is sufficiently thin and sufficiently ductile to readily permit its ablation by the tips of the blades of the wheel. In normal operation, the sealing ring thus consists of the wear layer proper, but in the case of a significant radial displacement of the wheel (for example, in the case of a severe imbalance caused by the rupture of a blade of the wheel), the cooling layer will also play the supplementary role of a reserve wear layer with regard to the normal wear layer.

In the final analysis, the total thickness of the composite layer constituted by the juxtaposition of the three elementary layers will not be larger than the thickness of a wear layer of the prior art.

BRIEF DESCRIPTION OF THE DRAWING

FIGS. 2–4 show different embodiments of the specific invention.

DESCRIPTION OF THE PREFERRED EMBODIMENTS

Figure 1:
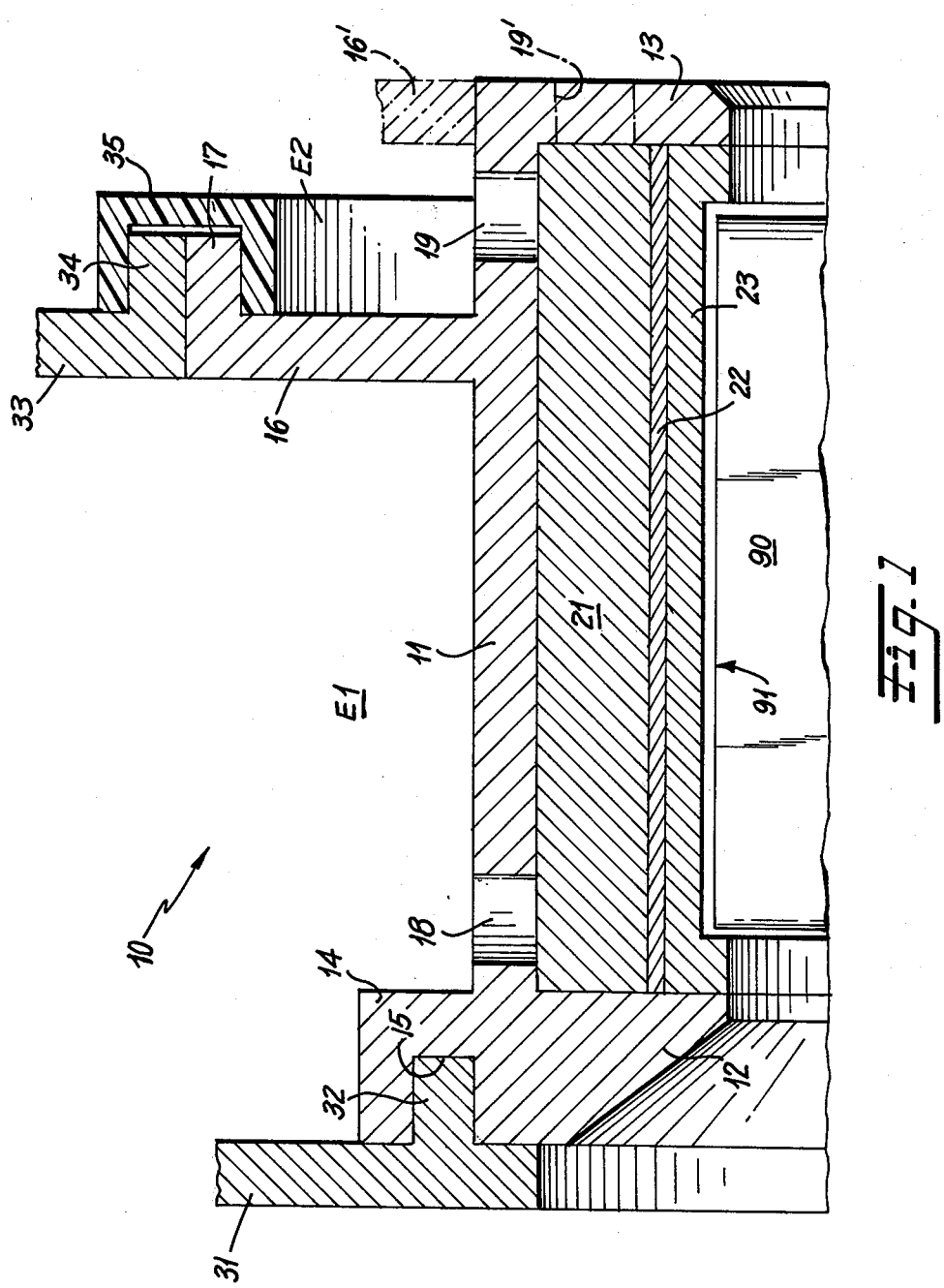
FIG. 1 is a sectional view showing the simplest form of the invention.
Figure 2:
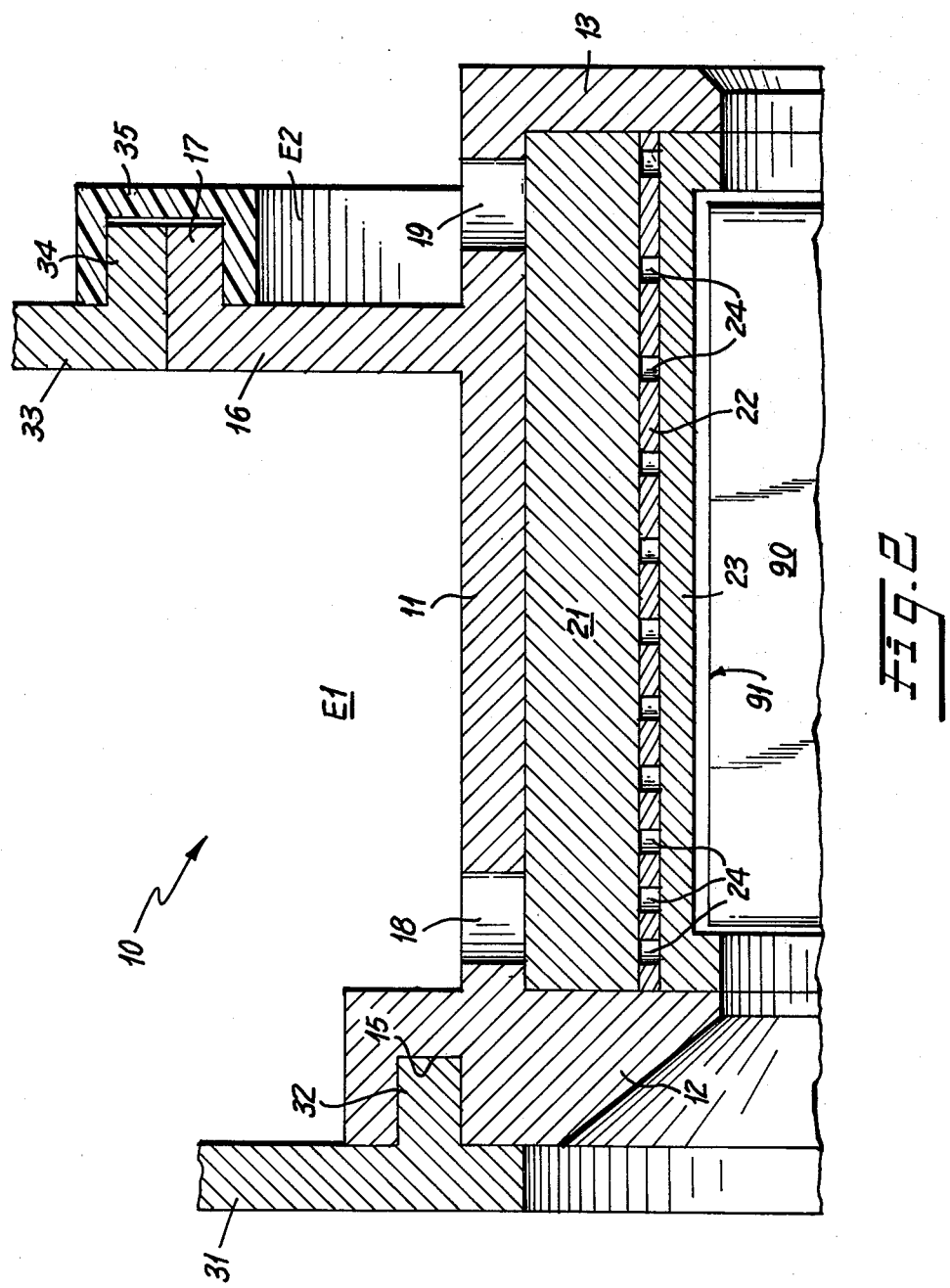

The annular support 10 (FIG. 1) is placed around the turbine wheel. An end of one of the blades 90 of the wheel is seen. The annular support 10 comprises a ferrule 11 having an upstream flange 12 and a downstream flange 13 so that its radial cross section forms a housing in the shape of a U, with its branches oriented toward the axis of the wheel and containing the three annular layers constituting the sealing ring of the invention. The three layers are, from the periphery toward the axis:

the cooling layer 21, placed against the internal wall of the ferrule 11, the separating layer 22 placed against the cooling layer 21 and extending to the internal edges of the flanges 12 and 13.

In normal operation, the ends of blades such as 91 abrade the surface of the wear layer 23, resulting in the fact that at rest a clearance exists between said layer and said ends of the blades.

The upstream flange 12 overlaps the external wall of the ferrule 11. A circular recess 15 is provided in the overlapping part 14, which caps an annular border 32 that is part of a cover 31, itself attached to the casing of the turbine. This casing is not shown.

The external wall of the ferrule 10 carries, in its downstream region and at a fixed distance upstream of the flange 13, an external flange 16 which supports an annular flange 17 which projects in the downstream direction. Both the flange 16 and the flange 17 fit into the circular orifice of a cover 33 that is again connected with the casing of the turbine. The cover 33 carries an annular flange 34 which surrounds the flange 17. An elastic fastening ring 35 with a U-shaped cross section holds the flanges 17 and 34 against each other to fasten the annular support 10.

The two covers 31 and 33 enclose a space E1. Behind the cover 33 there is a space E2 enclosed by the cover 33 and the turbine casing or by any other suitable means. The space E1 is supplied with cooling air coming from the compressor, not shown. The space E2 communicates with the jet of gas downstream from the wheel. The space E1 is thus at a higher pressure with respect to the space E2. Orifices for the admission of air, such as 18, are provided in the ferrule 11 immediately downstream of the flange 14; they serve to place into communication the cooling layer 21 and the space E1. Air evacuation orifices, such as 19 are provided in said ferrule 11 downstream from the flange 16; they place into communication said cooling layer 21 and the space E2. A flow of cooling air thus passes through the layer 21 from upstream to downstream, i.e., in an axial direction. The separating layer 22 is cooled by convection, by virtue of its contact with the flow of air, but also and primarily by conduction, by means of its contact with the cooling layer 21, which itself is cooled by air. It should be noted that the layers 21 and 22 cooperate to form a heat shield protecting the ferrule 10 against the heat of the gases passing through the wheel.

If the layer 21 is sufficiently thick, the orifices 19 provided in the furrule 11 may be replaced by orifices provided in the flange 13, such as the orifice 19′, shown by the dotted line. The flange 16 may then be displaced upstream, in the position 16′, i.e., outwardly of the flange 13.

In the form shown, the separating layer 22 is provided with a certain air permeability for the purpose of cooling the wear layer 23 not only by conduction but also by convection. However, this permeability remains such that the radial air flow passing across the layers 22 and 23 is appreciably less than the axial air flow traversing the layer 21. In order to ensure the homogeneous distribution of the radial flow in spite of the variation in the pressure of the gases during their passage through the wheel, the layer 22 may be provided advantageously with a permeability decreasing from upstream to downstream. In the drawing, it is assumed that the layer 22 is made of an air tight material. It is made permeable by means of a plurality of small orifices 24 with a density, i.e., the number of orifices per unit surface, is less downstream than upstream.

In the FIG. 3 arrangement there are shown a plurality of deflectors in the cooling layer 21 in order to increase the exchange of heat between the air and said layer to improve the cooling of the latter. These deflectors consist of projections in the form of the collars 25 and 26 inserted alternatingly in the layer 21. The projections 25 have an external diameter equal to the internal diameter of the ferrule 11 and an internal diameter appreciably larger than the external diameter of the separating layer 22. The projections 26 have an external diameter appreciably smaller than the internal diameter of the ferrule 11 and an internal diameter equal to the external diameter of the separating layer 22. In addition to their deflecting function, the projections 26 also act as radiators favoring the removal of heat from said layer 22.

The further arrangement of FIG. 4 consists of making the cooling layer 21 and the separating layer 22 of materials capable of being abraded by the ends of blades 91. This makes it possible to reduce the thickness of the wear layer 23 to the minimum compatible with the operation of the turbine under suitable conditions. In the case of a very large imbalance, due for example to the rupture of one or several blades, the ends of the remaining blades 91, cut their way into the layer 21, for example, to 91'. It is thus possible to form the composite layer, formed by the assembly of the three elementary layers 21, 22 and 23, of a total thickness that does not exceed the thicknes of a layer of the sealing ring of the prior art. If the projections 25 and 26 are present, the projections 26 must, therefore, also be made of a material capable of being abraded by the tips of the blades.

Examples relative to the constitution and the embodiment of the elements of the gasket of the drawings are given hereinbelow. It should be noted, however, that because of the independence of the functions of the different layers of the gasket, there is a certain latitude in the choice of materials.

The cooling layer 21 is brazed to the ferrule 11 and consists of a foam or a frit material based on a nickel-chromium alloy.

The separating layer 22 may be made of a foil (perforated or not) of a ductile alloy, for example, a nickel-chromium alloy, brazed to the layer 21, or by the plasma spraying of an alloy, for example, a nickel-chromium alloy.

The material of the wear layer 23 may consist for example of a refractory felt of a nickel-chromium alloy joined by brazing and diffusion with the separating layer 22 or of a deposit of a nickel-chromium alloy effected by plasma spraying. In the case wherein the separating layer is effectd by means of a plasma nozzle, the separating layer and the wear layer may consist of the same material having different moduli.

The projections 25 are made of a foil of a nickel-chromium alloy and are brazed to the ferrule 11. Concerning the projections 26, they are produced in situ by machining grooves into the cooling layer 21 and by filling these grooves with a deposit of a nickel-chromium alloy by means of a plasma nozzle. The projections 26 may also be produced by fusion, for example, by means of electron beam bombardment.

Finally, to complete the present description, indications concerning the thicknesses to be given to the different layers in most cases, are presented:

the cooling layr 21: 3 to 10 mm and preferably 5 to 6 mm;

the separating layer 22: 0.1 to 0.5 mm and preferably 0.1 to 0.2 mm;

the wear layer 23: 0.5 to 3 mm and preferably 1 to 1.5 mm.

We claim:

1. An assembly including a cooled sealing ring for the bladed wheel of a gas turbine of the type comprising successively from the periphery toward the axis:

an annular support surrounding the wheel, a first annular layer designated the "cooling layer" attached to the inner surface of said annular support and made of a material permeable to air, cooling air inlet means at the upstream region of said cooling layer, downstream exhaust means and deflectors in said cooling layer, said cooling layer being of a material whereby it serves as a reserve wear layer;

a thin, separating layer radially inwardly of said cooling layer, said separating layer being permeable to air with its permeability decreasing from upstream to downstream; and a wear layer adjacent the ends of the wheel blades and made of a material capable of being abraded by said blades and being traversed radially by the air from the cooling layer passing through the separating layer.

2. A sealing ring according to claim 1 wherein the separating layer is made of perforated foil.

3. A sealing ring according to claim 2 wherein the separating layer is a deposit obtained by plasma spraying onto the cooling layer.

4. A sealing ring according to claim 1 wherein the separating layer is appreciably thinner than the wear layer which itself is appreciably thinner than the cooling layer.

5. A sealing ring according to claim 4 wherein the thicknesses of the three layers are such that in normal operation the ends of said blades are out of contact with the separating layer.

6. A sealing ring according to claim 5 wherein the thickness of the cooling layer is between 3 and 10 mm, the thickness of the separating layer between 0.1 and 0.5 mm and the thickness of the wear layer between 0.5 and 3 mm.

7. A sealing ring according to claim 6 wherein the thickness of the cooling layer is between 5 and 6 mm, the thickness of the separating layer between 0.1 and 0.2 mm and the thickness of the wear layer between 1 and 1.5 mm.

* * * * *